United States Patent Office 2,958,575
Patented Nov. 1, 1960

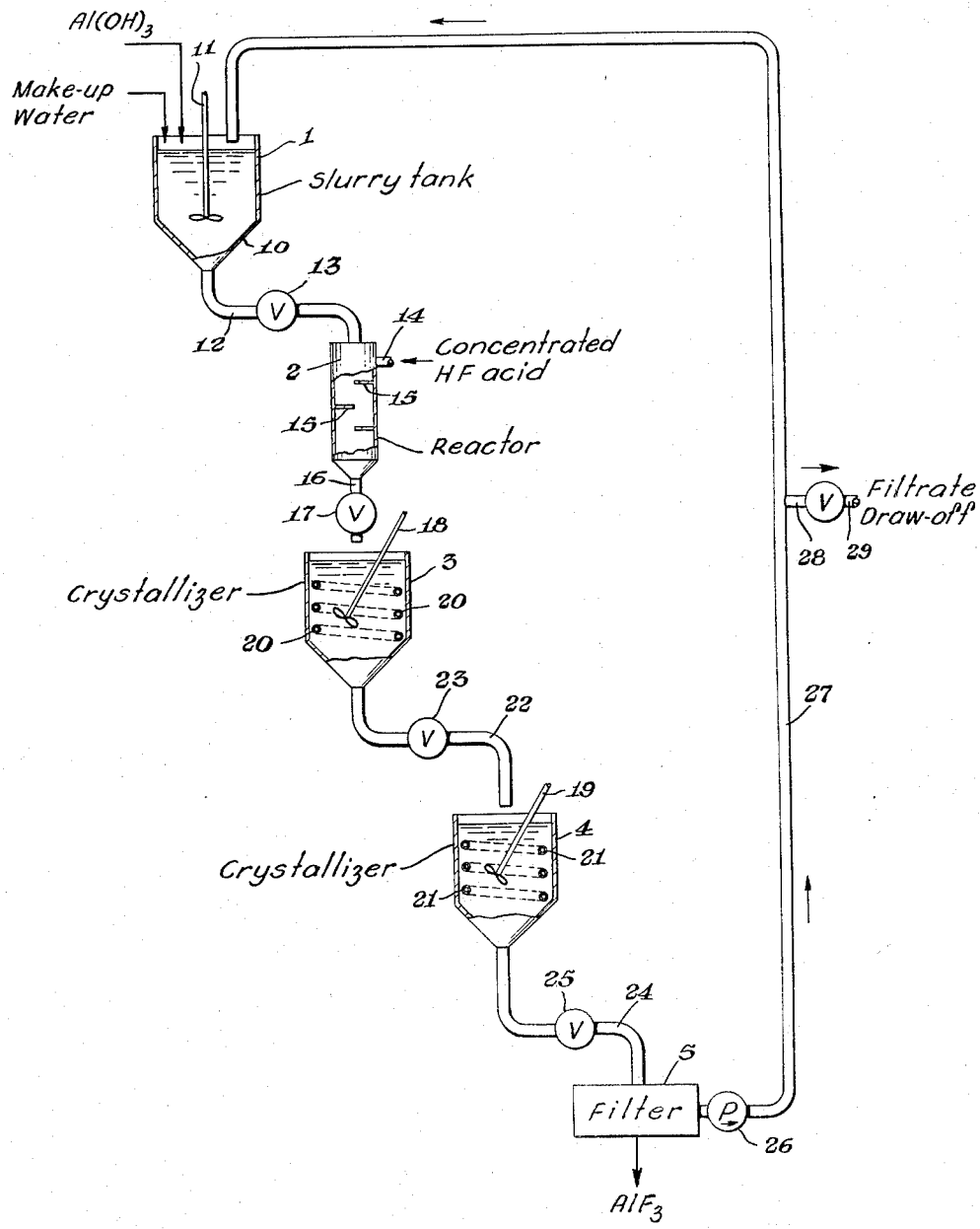

2,958,575

PREPARATION OF ALUMINUM FLUORIDE

Donald R. Allen, Lake Jackson, Tex., assignor to The Dow Chemical Company, Midland, Mich., a corporation of Delaware Filed Apr. 21, 1958, Ser. No. 729,624

2 Claims. (Cl. 23—88)

This invention relates to an improved continuous process for the preparation of aluminum fluoride, and more particularly, to a process for the preparation of aluminum fluoride by the reaction of aluminum hydroxide and hydrofluoric acid.

Heretofore, the production of aluminum fluoride in granular or crystalline form has been by precipitation from relatively dilute solutions. While aluminum fluoride is relatively insoluble in dilute aqueous solutions, the crystallization rate is slow. Thus, to obtain a substantial yield of the product from the solution a long crystallization time was needed.

It is an object of this invention to provide a continuous process for the production of aluminum fluoride wherein readily filterable crystals of aluminum fluoride in high yield are obtained with a relatively short crystallization time.

The above and other objects are attained, according to the invention, by continuously charging concentrated hydrofluoric acid, containing from 40 to 60 weight percent of hydrogen fluoride, and a slurry of aluminum hydroxide into a reactor, preferably having an average retention time of from 1 to 5 minutes, where the aluminum hydroxide and the hydrofluoric acid are reacted to form aluminum fluoride. The slurry charged to the reactor is made by intermixing aluminum hydroxide with water and mother liquor obtained from the last step of the process in proportions such that the slurry contains a sufficient amount of water to dilute the hydrofluoric acid charged into the reactor to a concentration in the range of 13 to 17 weight percent. The reacted mixture is discharged from the reactor into a crystallizer or set of crystallizers where the mixture is maintained at a temperature of from 80° C. to the boiling point of the mixture for a crystallization time of from 15 to 30 minutes. Readily filterable crystals of aluminum fluoride are obtained which are then separated from the mixture, such as by filtration, and the mother liquor returned to the process to be intermixed with more aluminum hydroxide.

It is known that when aluminum hydroxide is intermixed with hydrofluoric acid containing above 30 weight percent of hydrogen fluoride, a gel of aluminum hydroxide is obtained which will solidify upon setting. By contacting a slurry of aluminum hydroxide which contains sufficient water to dilute the hydrofluoric acid to from 13 to 17 weight percent of acid, a precipitate of aluminum fluoride is obtained and not a gel. However, by contacting the slurry with concentrated acid, zones of high acid concentration are obtained in the slurry for short periods of time before the acid and the slurry are completely intermixed. Since the slurry made with the mother liquor is substantially saturated, nucleation of aluminum fluoride is obtained in these zones. When the slurry with the acid is completely mixed, the nuclei of aluminum fluoride are present in the dilute solution which result in rapid crystallization.

The invention and its objects and advantages may be better understood by referring to the following description taken in connection with the accompanying drawing in which the process is diagrammatically shown.

The apparatus in the process as diagrammatically shown in the drawing comprises a slurry tank 1, a reactor 2, two crystallizers in series numbered 3 and 4 respectively, a filter 5, and the necessary piping to interconnect the above units. As shown, the slurry tank 1 is an open tank having a conical bottom section 10 and is equipped with a stirrer 11. An outlet located at the bottom of the conical section of the tank is connected by pipe 12 to an inlet at the top of the reactor. A valve 13 located in pipe 12 is used as a means to control the rate of flow from tank 1 into the reactor. The reactor is a vertically disposed cylindrical vessel having a second inlet at the top connected to pipe 14 through which the hydrofluoric acid is introduced. Baffles 15 in the reactor provide agitation to the reactants as they flow through. An outlet located at the bottom of the reactor is connected to a pipe 16 which discharges into the first crystallizer 3. A valve 17 in pipe 16 regulates the rate of discharge from the reactor. As shown crystallizers 3 and 4 are open tank type crystallizers each equipped with a stirrer 18 and 19 respectively and heating coils 20 and 21 respectively. A pipe 22 having a valve 23 is connected to the outlet from crystallizer 3 and discharges into crystallizer 4, while pipe 24 having a valve 25 connects the outlet of crystallizer 4 with filter 5. From filter 5 a pump 26 is used as a means for returning the filtrate to slurry tank 1 through a pipe 27. Pipe 28 having a valve 29 is connected to pipe 27 and provides a means to draw off a portion of the filtrate.

In the operation of the process, aluminum hydroxide is continuously added to slurry tank 1 where it is mixed by stirrer 11 with the filtrate coming from filter 5 through pipe 27 to form a slurry. Make up water may be added to the slurry if necessary. The slurry so obtained is continually passed through pipe 12 into reactor 2 where concentrated hydrofluoric acid is injected in not greater than stoichiometric proportions through pipe 14. The rates at which the slurry and the hydrofluoric acid are charged into the reactor is such that preferably an average retention time of from 1 to 5 minutes is obtained in the reactor. In passing through the reactor, the reactants are intermixed by baffles 15 and the hydrofluoric acid reacted with the aluminum hydroxide. The effluent of the reactor is discharged through pipe 16 into crystallizer 3 where steam passed through heating coils 20 maintains the solution at the desired crystallization temperature. The mixture from crystallizer 3 is then discharged into crystallizer 4 which likewise is heated by use of steam in heating coil 21. The solution in each of the crystallizers is agitated by stirrers 18 and 19 respectively. The crystallizers are of such size that total crystallization time provided in both of the crystallizers is from 15 to 30 minutes. If desired, a single crystallizer may be used instead of the two as shown. From crystallizer 4 the mixture is discharged to filter 5 where the precipitated aluminum fluoride is recovered. The filtrate from filter 5 is recycled back to surge tank 1 by means of pump 26 to be intermixed with more aluminum hydroxide. A portion of the filtrate coming from filter 5 is withdrawn from the system through pipe 28 to prevent the impurities in the system from building up and contaminating the aluminum fluoride product.

The rate of reaction between hydrofluoric acid and aluminum hydroxide is very rapid and may be substantially completed in about 30 seconds. However, since concentrated hydrofluoric acid is used, it is preferred to use a reactor having a retention time of from 1 to 5 minutes to insure that the hydrofluoric acid is substantially completely reacted before the mixture is discharged into the crystallizer. The vaporization of the acid is thus prevented and the corrosion problem in the crystallizer is minimized. In place of a reactor as shown in the drawing, the acid may be injected into the pipe line carrying the aluminum hydroxide slurry to the crystallizer and the portion of the line after the injection of the acid be used as a reactor.

Hydrofluoric acid having a concentration of from 40 to 60 weight percent of acid may be used in the reaction. It is preferred to use an acid having a concentration of about 52 weight percent, since acid of this concentration is most often sold commercially. Thus, the commercially available acid is used directly in the process without any dilution or concentration.

Generally stoichiometric amounts of aluminum hydroxide and hydrofluoric acid are reacted. However a slight excess of aluminum hydroxide may be used. Although relatively pure reactants are desirable, commercial or technical grades of aluminum hydroxide and hydrofluoric acid are suitable. Since the mother liquor is recycled in the process, the impurities would rapidly build up in the mother liquor resulting in contamination of the aluminum fluoride product if the aluminum hydroxide or the acid contained a considerable amount of impurities. With the technical grade of reactants generally available commercially, a small portion, such as 0.5 to 2 percent, of the mother liquor continually withdrawn from the system will keep the concentration of the impurities from increasing to the extent that they are carried down with the aluminum fluoride product.

In the process, an average crystallization time of 15 to 30 minutes is employed. Where more than one crystallizer is used, the retention time in each is about the same with the total time used being equal to 15 to 30 minutes. It is preferred to use a retention time of 20 minutes which is sufficient to obtain a readily filterable product.

The temperature employed in the crystallizer may be as low as 80° C. and as high as the boiling point of the mixture. Generally, a temperature in the range of 95° to 100° C. is preferred. At the preferred temperature, the evaporation rate of the water from the solution in the crystallizer is sufficient to evaporate the water coming into the system with the acid and by the reaction of the hydrofluoric acid and the aluminum hydroxide. Thus, by using a temperature in the preferred range, the amount of mother liquor obtained, with the exception of the amount that is continuously withdrawn from the system, is just sufficient to be intermixed with aluminum hydroxide to obtain the proper slurry without the addition of make up water. When the crystallizer temperature is below 95° C., an excess of mother liquor is obtained. With temperatures above 100° C. the loss of water by evaporation is greater in amount than the water being added to the system with the acid and by the reaction so that considerable amount of make up water has to be added in the slurry tank. The reaction of hydrofluoric acid and the aluminum hydroxide is exothermic and generally very little heat has to be added to maintain the crystallizers in the preferred temperature range.

To illustrate the invention a cyclic process was used. A mother liquor to be used in the cyclic process was made by reacting 100 grams of hydrofluoric acid containing 52 weight percent of hydrogen fluoride with a slurry composed of 247 milliliters of water and 67.6 grams of aluminum hydroxide. The reaction mixture was maintained at 95 to 100° C. for 30 minutes and filtered. The filtrate so obtained was then used to slurry another 67.6 grams of aluminum hydroxide. The slurry composed of the filtrate from the preceding batch plus the 67.6 grams of aluminum hydroxide was reacted with 100 grams of 52 weight percent hydrofluoric acid. The reaction mixture was again maintained at 95 to 100° C. for 30 minutes and filtered. The process was repeated for the third time and the filtrate obtained from this third reaction was used in the cyclic process.

The mother liquor obtained above in the amount of 247 milliliters was slurried with 67.6 grams of aluminum hydroxide. To the slurry of aluminum hydroxide so obtained 100 grams of hydrofluoric acid containing 52 weight percent of hydrogen fluoride were then added. After the addition of the acid, the mixture was maintained at about 100° C. for 20 minutes and then filtered. The wet filter cake of aluminum fluoride obtained was weighed and the hot filtrate was mixed with additional 67.6 grams of aluminum hydroxide. The cycle above was repeated for a total of 10 times using the filtrate from the preceding reaction to be intermixed with 67.6 grams of more aluminum hydroxide. The evaporation of the water from the mixture during the crystallization period at about 100° was approximately equal to the water being added to the system with the acid and resulting from the reaction. Approximately 247 milliliters of filtrate was obtained in each cycle and only in a few cycles was it necessary to add make up water to bring the volume of the filtrate to 247 milliliters.

In the 10 cycles, an average of 132 grams of wet filter cake containing approximately 55 weight percent of aluminum fluoride was obtained per cycle which represented a yield of aluminum fluoride over 99 percent.

To show the improved crystallization rate obtained by reacting concentrated hydrofluoric acid and a slurry made with mother liquor, a run was made where 67.6 grams of aluminum hydroxide were reacted with hydrofluoric acid containing 15 weight percent of hydrogen fluoride. The aluminum hydroxide was added to the acid while the mixture was agitated. The mixture was maintained at a temperature of approximately 100° C. for 2½ hours and then filtered. Upon filtration approximately 42 grams of wet filter cake was obtained containing about 55 weight percent of aluminum fluoride. The aluminum fluoride recovered in the filter cake represented about a 31.5 percent yield. The run above was repeated except that a crystallization time of 3½ hours was used. In using a 3½ hour crystallization time, approximately 55 percent of the aluminum fluoride was recovered in the wet cake.

What is claimed is:

1. A continuous process for the preparation of aluminum fluoride, which comprises continuously charging an aqueous hydrofluoric acid solution containing from 40 to 60 weight percent of the acid into a reactor having a retention time of from 30 seconds to 5 minutes; continuously introducing an aluminum hydroxide slurry into the reactor, intermixing the slurry with the hydrofluoric acid therein so as to react the aluminum hydroxide with the hydrofluoric acid to form aluminum fluoride, said slurry being obtained by mixing aluminum hydroxide with water and the mother liquor obtained from the last step of the process in proportions such that the total water in the slurry is sufficient to dilute the hydrofluoric acid to a concentration of from 13 to 17 weight percent; continually discharging the reacted mixture of aluminum hydroxide and hydrofluoric acid from the reactor into a crystallizer; heating the reacted mixture in the crystallizer to a temperature between 80° C. and the boiling point for from 15 to 30 minutes so as to crystallize out aluminum fluoride; separating the crystals of aluminum fluoride so formed from their mother liquor; and recycling the mother liquor to the first step of the process.

2. A continuous process for the preparation of aluminum fluoride, which comprises continuously charging an aqueous hydrofluoric acid solution containing 52 weight percent of the acid into a reactor having a retention time of from 1 to 5 minutes; continuously introducing an aluminum hydroxide slurry into the reactor in stoichiometric proportions to the acid, intermixing the slurry with the hydrofluoric acid therein so as to react the aluminum hydroxide with the hydrofluoric acid to form aluminum fluoride, said slurry being obtained by mixing aluminum hydroxide with filtrate obtained from the last step of the process and water in proportions such that the total water in the slurry is sufficient to dilute the hydrofluoric acid to a concentration of about 15 weight percent; continually discharging the reacted mixture from the reactor into a crystallizer; heating the reacted mixture in the crystallizer to a temperature in the range of 95° to 100° C. for about 20 minutes so as to crystallize the aluminum fluoride; filtering the mixture from the crystallizer to separate the crystallized aluminum fluoride from the mother liquor; and recycling the mother liquor to be mixed with more aluminum hydroxide.

References Cited in the file of this patent

UNITED STATES PATENTS

| 1,237,488 | Doremus | Aug. 21, 1917 |
| 1,563,536 | Specketer | Dec. 1, 1925 |
| 2,454,921 | Heinemann | Nov. 30, 1948 |

OTHER REFERENCES

Jacobsen: "Encyclopedia of Chemical Reactions," vol. 1, page 123 (1946), Reinhold Publishing Company, N.Y.

Mellor: "Comprehensive Treatise on Inorganic and Theoretical Chemistry," vol. 5, page 302 (1924), Longmans, Green and Co. New York, N.Y.